(12) United States Patent
Makino et al.

(10) Patent No.: US 6,802,498 B2
(45) Date of Patent: Oct. 12, 2004

(54) CYLINDRICAL MOUNTING APPARATUS EQUIPPED WITH BRACKET

(75) Inventors: Takashi Makino, Kasugai (JP); Akihiro Mayama, Aiko-gun (JP)

(73) Assignees: Tokia Rubber Industries, Ltd., Komaki (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/427,584

(22) Filed: Apr. 30, 2003

(65) Prior Publication Data

US 2003/0214085 A1 Nov. 20, 2003

(30) Foreign Application Priority Data

May 14, 2002 (JP) ........................................ 2002-138059

(51) Int. Cl.⁷ .............................................. F16F 13/00
(52) U.S. Cl. .................. 267/140.13; 267/293; 267/141; 267/4; 248/562; 248/638; 248/635
(58) Field of Search ........................ 267/140.11, 140.12, 267/140.13, 141.1, 141.2, 141.3, 141.4, 141.5, 141.7, 293; 248/562, 638, 634, 635

(56) References Cited

U.S. PATENT DOCUMENTS

| | | | | |
|---|---|---|---|---|
| 4,997,169 A | * | 3/1991 | Nakamura et al. ...... | 267/140.13 |
| 5,009,404 A | * | 4/1991 | Hirazawa ................ | 267/140.13 |
| 5,190,269 A | * | 3/1993 | Ikeda et al. ............ | 267/140.12 |
| 5,503,376 A | * | 4/1996 | Simuttis et al. .............. | 267/293 |
| 5,547,172 A | * | 8/1996 | Corcoran ................ | 267/140.13 |
| 5,551,675 A | * | 9/1996 | Simuttis et al. .............. | 267/293 |
| 5,628,498 A | * | 5/1997 | Nanno .................... | 267/140.13 |
| 5,743,509 A | * | 4/1998 | Kanda et al. ................ | 248/635 |
| 5,992,816 A | * | 11/1999 | Yoshida et al. ............. | 248/638 |
| 6,116,587 A | * | 9/2000 | Miyahara ............... | 267/140.12 |
| 6,120,011 A | * | 9/2000 | Maeno et al. .......... | 267/140.11 |
| 6,375,173 B1 | * | 4/2002 | Takashima et al. .... | 267/140.13 |
| 6,390,459 B2 | * | 5/2002 | Saitoh .................... | 267/140.13 |
| 6,439,555 B2 | * | 8/2002 | Takashima et al. .... | 267/140.13 |
| 2002/0041064 A1 | * | 4/2002 | Shinobu et al. ........ | 267/140.11 |
| 2002/0145239 A1 | * | 10/2002 | Yamaguchi et al. ... | 267/140.12 |

FOREIGN PATENT DOCUMENTS

JP         2001-180296            7/2001

* cited by examiner

Primary Examiner—Robert A. Siconolfi
Assistant Examiner—Devon Kramer
(74) Attorney, Agent, or Firm—Beyer Weaver & Thomas LLP

(57) ABSTRACT

A cylindrical mounting apparatus includes: a cylindrical mount having an elastic body elastically connecting an inner and outer sleeve disposed in mutually spaced-apart relation; and a bracket independent of the cylindrical mount and having a pair of support plates opposed to each other with a spacing therebetween. The mount is interposed between the pair of support plates and fastened to the bracket by a mounting bolt extending through a bore of the inner sleeve across the support plates. Two positioning protrusions protrude from an inside surface of one support plate toward the other, and a mounting plate is disposed on one axial end of the inner sleeve extending diametrically. A recessed engaging portion of the mounting plate is brought into engagement with the positioning projections to place the mounting plate in a predetermined position about its center axis on the support plate.

9 Claims, 7 Drawing Sheets

CYLINDRICAL MOUNTING APPARATUS EQUIPPED WITH BRACKET

INCORPORATED BY REFERENCE

The disclosure of Japanese Patent Application No. 2002-138059 filed on May 14, 2002 including the specification, drawings and abstract is incorporated herein by reference in its entirety.

BACKGROUND OF THE INVENTION

1. Field of the Invention

The present invention generally relates to cylindrical mounting apparatuses equipped with brackets, which are useful as mounts for automotive vehicles, such as engine mounts, body mounts, deferential mounts and cab mounts. More specifically, the invention is concerned with a cylindrical mounting apparatus, which is novel in construction and which ensures improved efficiency in assembling the cylindrical mount with the bracket.

2. Description of the Related Art

A cylindrical mount is known as one type of a vibration damping coupling (bushing) or mount, which is interposed between two members of a vibration system so as to flexibly connect these two members or mount one of these members on the other member in a vibration damping fashion. A known cylindrical mount includes a metallic inner and outer sleeve which are disposed in mutually spaced-apart relation with each other, and an elastic body interposed between the inner and outer sleeves so as to elastically connect the inner and outer sleeves. The known cylindrical mount is capable of exhibiting desired damping effects with respect to various kinds of vibrations applied thereto in a plurality of directions orthogonal to a center axis thereof. By forming axial bores in the elastic body, the cylindrical mount can be easily tuned in terms of a ratio of spring stiffness values in different diametric directions thereof. For the above advantages, the cylindrical mount has been widely used as engine mounts, body mounts or other mounts for automotive vehicles.

When installing such a cylindrical mount into a desired vibration system, it is important to fixedly attach the inner and outer sleeves to respective members of the vibration system, e.g., a power unit and a body of an automotive vehicle. To this end, there has been widely employed to use a bracket specifically configured in consideration of configurations or other features of seat portions of the respective members of the vibration system so that the inner and outer sleeves are firmly attached on the seat portions of the respective members of the vibration system via the bracket. In this regards, a bracket for the inner sleeve generally includes a pair of support plates opposed to each other with a spacing substantially corresponding to an axial length of the inner sleeve. The cylindrical mount is inserted into the spacing between the pair of support plates of the bracket and fixed firmly to the bracket by fastening a long mounting bolt extending through a bore of the inner sleeve and through holes formed through the respective support plates to the bracket.

However, the bracket of conventional structure as described above requires manual operations in a blind manner: of inserting the cylindrical mount into the spacing between the support plates; of arranging the bore of the inner sleeve in alignment with the through holes of the support plates; and of inserting the bolt into these through holes of the support plates and the bore of the inner sleeve to fasten the same to the bracket. Therefore, the use of the bracket of conventional structure inevitably requires cumbersome and prolonged operations, and causes a problem of variation in operation efficiency depending on skills of operators.

Additionally, many conventional cylindrical mounts require adjustment of their angular orientations when assembled with the brackets, in consideration of their spring characteristics in diametric directions orthogonal to their axial directions. In each case, the conventional cylindrical mount needs further a manual operation for appropriately positioning the cylindrical mount about its center axis, in addition to the above-described cumbersome manual operations. This makes the assembly more complicate, and may possibly cause deterioration in operability as well as occurrence of defective products due to directional errors during assembling the cylindrical mounts with the bracket.

JP-A-2001-180296 discloses one example of the conventional cylindrical mount wherein a bracket of sideway U-letter shape has opposite side walls between which the cylindrical mount is extended. A pair of reinforcing plates are welded to respective inside surfaces of the opposite side walls of the bracket, to thereby provide stoppers projecting inwards from the respective inside surfaces of the opposite side walls in order to mark the ending of insertion of the cylindrical mount into the bracket. However, the stoppers just make it possible to position the cylindrical mount relative to the bracket in a direction of insertion of the cylindrical mount to the bracket, it is still difficult to position the inner sleeve of the cylindrical member in alignment with bolt holes formed through the bracket. In particular, the angular orientation of the cylindrical mount is not taken into consideration at all in the cylindrical mount of construction disclosed in JP-A-2001-180296. If it is needed to consider the angular orientation of a cylindrical mount when assembling the cylindrical mount with the bracket, the structure or other teaching of the cylindrical mount disclosed in JP-A-2001-180296 never shows a measure for this problem, i.e. for appropriately positioning the cylindrical mount in its circumferential direction.

SUMMARY OF THE INVENTION

It is therefore one object of this invention to provide a cylindrical mounting apparatus equipped with a bracket, which is novel and simple in construction, which makes it easy to insert a mounting bolt into a bore of an inner sleeve of a cylindrical mount to fasten the mount into the bracket, and which makes it possible to assemble the cylindrical mount with the bracket with ease and excellent efficiency.

The above and/or other objects may be attained according to at least one of the following modes of the invention. Each of these modes of the invention is numbered like the appended claims and depending from the other mode or modes, where appropriate, to indicate possible combinations of elements or technical features of the invention. It is to be understood that the following modes or elements of the invention may be adopted at any possible optional combinations, and that the present invention is not limited to the following modes or combinations of these modes, but may otherwise be recognized based on the thought of the present invention that described in the whole specification and drawings or that may be recognized by those skilled in the art in the light of the disclosure in the whole specification and drawings.

(1) A cylindrical mounting apparatus equipped with a bracket comprising: (a) a cylindrical mount including an inner and outer sleeve disposed in mutually spaced-apart relation with each other, and an elastic body interposed between the inner and outer sleeves so as to elastically connect the inner and outer sleeves; (b) a bracket independent of the cylindrical mount, having a pair of support plates opposed to each other with a spacing therebetween, and assembled with the cylindrical mount such that the cylindrical mount is inserted into the spacing between the pair of support plates and fasten to the bracket by means of a mounting bolt extending through a bore of the inner sleeve across the pair of support plates; (c) two positioning protrusions formed on and protruding from at least one of the pair of support plates toward an other of the pair of support plate; and (d) a mounting plate disposed on one of axially opposite end portions of the inner sleeve so as to extend in a direction orthogonal to an axial direction of the inner sleeve, the mounting plate being held in contact with an inside surface of the at least one of the pair of support plates, and having an engaging portion of recessed shape, which is open in an outer circumferential surface of the mounting plate, and which is brought into abutting contact with the two positioning projections so as to place the mounting plate in a predetermined position about a center axis of the inner sleeve on the inside surface of the at least one of the pair of support plates.

The cylindrical mounting apparatus constructed according to this mode of the invention is capable of positioning the cylindrical mount and the bracket relative to each other through a simple positioning structure effectively utilizing an engagement between the mounting plate formed on the inner sleeve of the cylindrical mount and at least two positioning protrusions formed on the support plate. Described in detail, by superposing the mounting plate of the cylindrical mount onto the support plate of the bracket, the inner sleeve of the cylindrical mount can be positioned relative to the bracket in its axial and diagonal (torsional) directions. With the inner sleeve of the cylindrical mount positioned relative to the bracket in its axial and diagonal directions as described above, the recess-shaped engaging portion of the mounting plate is brought into engagement with the two positioning protrusions formed on the support plate of the bracket, thereby positioning the inner sleeve of the cylindrical mount relative to the bracket in a circumferential direction about the center axis of the inner sleeve and in one diametric direction of the inner sleeve. Thus, the inner sleeve of the cylindrical mount can be easily and efficiently positioned in the predetermined position on the support plate of the bracket, where a bore of the inner sleeve is in alignment with the through holes formed through the pair of support plates.

The adoption of the above-described simple positioning structure permits an easy and quick positioning of the cylindrical mount and the bracket when assembling the mount and the bracket. Additionally, the bore of the inner sleeve is in alignment with the through holes of the support plates when the inner sleeve of the cylindrical mount is placed in the desired position relative to the bracket, making it easy to quickly insert the mounting bolt into the through holes of the support plates and the bore of the inner sleeve. According to the present mode of the invention, the cylindrical mount can be easily, efficiently and stably assembled with the bracket, without needing sophisticated skills of operators, thereby skyrocketing efficiency in assembling operation.

According to this mode of the invention, the cylindrical mount may have a variety of configurations without any specific limitation. For instance, it is certainly possible as a matter of design to form slits or bores of suitable shape and size into the elastic body elastically connecting the inner and outer sleeves, for suitably adjusting the spring characteristics of the cylindrical mount. It is also possible to adopt a variety of conventional fluid filled cylindrical mounts each having a fluid chamber partially defined by the elastic body and filled with a non-compressible fluid so as to exhibit vibration damping effect with the help of resonance or flows of the non-compressible fluid. Similarly, the bracket may be suitably designed with no limitation in terms of its shape, size or the like, depending on a shape or structure of a member of a vibration system, such as an engine mount, to which the bracket is attached. Also, the bracket is not limited in terms of its material, structure or the like. For instance, aluminum alloy products formed by protruding and products formed of welded steel plates may be adoptable as a bracket with no limitation. Further, the mounting plate may be integrally formed on the inner sleeve of the cylindrical mount, or alternatively bonded to the inner sleeve by welding, pressing, fixing or the like. Also, the mounting plate may have a variety of configurations including a disk shape, an ellipsoidal disk shape and a polygonal plate shape.

The configuration of the engaging part is not particularly limited provided that the engaging part of the mounting plate is formed with a cutout or recessed shape in order to ensure that the engaging part is brought into engagement with the positioning protrusions formed on the support plate of the bracket so that the inner sleeve of the cylindrical mount is positioned relative to the bracket in its diametric and circumferential directions. For instance, the engaging part may be divided into mutually independent two engaging sections brought into engagement with the positioning protrusions, respectively, or alternatively has a cutout shape in which two engaging sections adapted to be engaged with the respective positioning protrusions are circumferentially contiguous to each other, which will be described as a second mode.

(2) A cylindrical mounting apparatus according to the above indicated mode (1), wherein the engaging portion comprises a cutout portion formed at a peripheral portion of the mounting plate, extending circumferentially with a circumferential length not larger than a half of a circumference of the mounting plate, and circumferentially opposite end portions of the cutout portion are brought into engagement with the two positioning protrusions of the at least one of the pair of support plates, respectively.

According to this mode of the invention, the engaging part of the mounting plate is made large in the circumferential direction. This permits that one of the two positioning protrusions is first inserted into the cutout portion, and then the other positioning protrusion is inserted into the cutout portion by rotating the mounting plate and the other positioning protrusion relative to each other in the circumferential direction, making it more easy to bring the engaging portion of the mounting plate into an engagement with the positioning protrusions. Preferably, the cutout portion is shaped to expand gradually in its circumferential dimension toward the peripheral portion of the mounting plate. This further facilitates more operation for bringing the cutout portion into the two positioning protrusions.

(3) A cylindrical mounting apparatus equipped with a bracket according to the above indicated mode (2), further comprising a plate-form member independent of the cylindrical mount and the bracket, the plate-form member being superposed on the mounting plate, sandwiched between and supported by the mounting plate and the at least one of the pair of support plates, and having an engaging jaw brought into engagement with a circumferentially intermediate portion of the cutout portion of the mounting plate. While, in general, cylindrical mounts may be optionally provided with plate-form members, e.g., heat insulating plates (insulators) or stopper plates for engine mounts and guide or support plates for assembly, the arrangement according to this mode of the invention makes it possible to easily and quickly attach such a plate-form member to the cylindrical mounting device at the same time when the cylindrical mount assembled with the bracket, by compressing the plate-form member by and between the mounting plate of the cylindrical mount and the support plate of the bracket. A further advantage of this mode is that the engaging jaw formed at the plate-form member is arranged to be held in contact with the circumferentially intermediate portion of the cutout portion, which portion is remote from other circumferential portions of the cutout portion that are adapted to be held in engagement with the positioning protrusions, thereby eliminating a need for an additional arrangement applied to the mounting plate for receiving the engaging jaw.

(4) A cylindrical mounting apparatus equipped with a bracket according to the above-indicated mode (3), wherein the mounting plate has a disk-like shape and includes two of the cutout portions located at respective portions diametrically opposed to each other, and wherein one of the cutout portions is adapted to be brought into engagement with the engaging jaw at the circumferentially intermediate portion thereof, and the plate-form member includes an engaging projection adapted to be brought into engagement with circumferentially opposite end portions of an other of the cutout portions so that the plate-form member is placed in a predetermined position on the mounting plate as a result of engagement of the two cutout portions with the engaging jaw and the engaging projections, respectively. According to this mode of the invention, an axial positioning of the plate-form member can be established by compressing the plate-form member by and between the mounting plate of the cylindrical mount and the support plate of the bracket, while a diametrical and circumferential positioning of the plate-form member can also be established by means of the engagement of the engaging jaw as well as the positioning projections of the plate-form member with the respective cutout portions of the mounting plate. That is, the present mode of the invention makes it possible to quickly and easily fix the plate-form member to the cylindrical mounting apparatus, through the simple structure as described above.

(5) A cylindrical mounting apparatus equipped with a bracket according to any one of the above-indicated modes (1)–(4), wherein a specific angular orientation of the cylindrical mount is determined for assembling the cylindrical mount with the bracket. According to this mode of the invention, with the held of the engagement of the engaging part of the mounting plate with the positioning protrusions of the bracket, the cylindrical mount can be assembled with the bracket with its angular orientation desirably set. Therefore, a serious attention to the angular orientation of the cylindrical mount is no longer required for assembling the cylindrical mount with the bracket, thereby eliminating or minimizing occurrence of miss assembly (6) A cylindrical mounting apparatus equipped with a bracket according to any one of the above-indicated modes (1)–(5), wherein the outer sleeve includes a flange-form portion formed at one of axially opposite ends thereof so as to extend in a radially outward direction of the outer sleeve, the flange-form portion being opposed to the mounting plate of the inner sleeve with an axial spacing therebetween, and elastically connected with the mounting plate by the elastic body. According to this mode of the invention, an adjusting structure for adjusting the spring stiffness of the cylindrical mount in its axial direction is effectively embodied by utilizing the mounting plate used in the above-described positioning structure for the inner sleeve.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
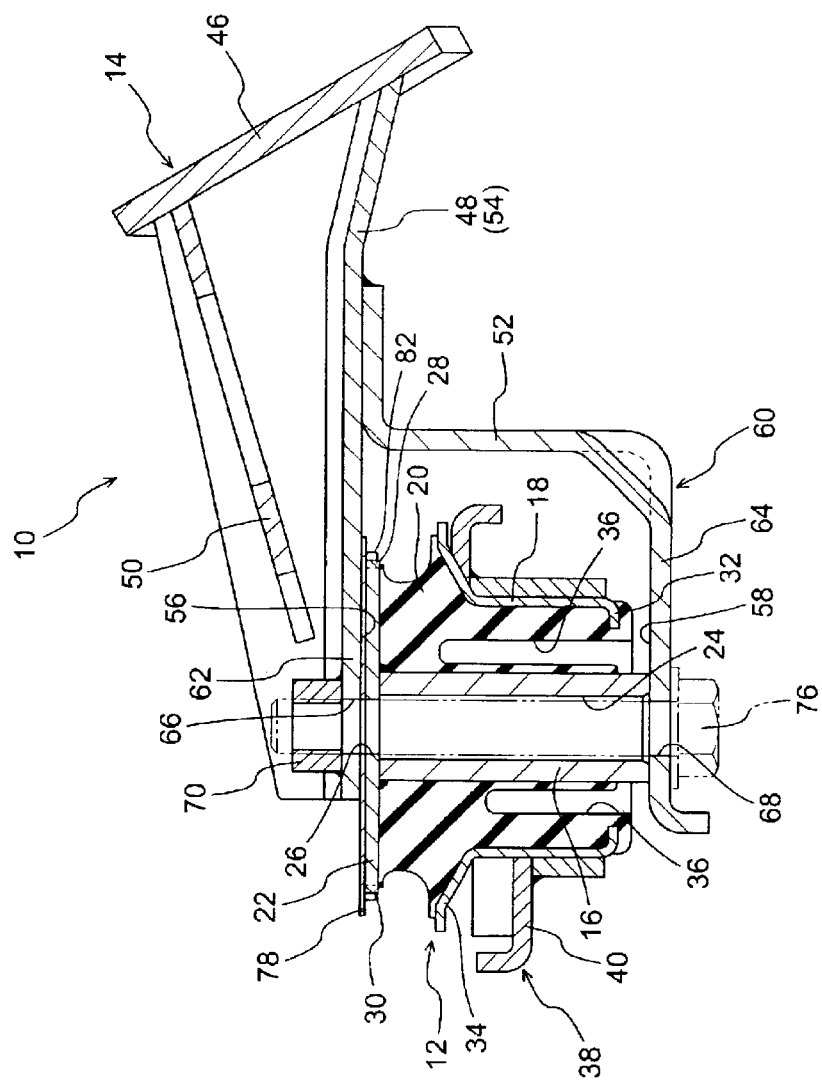
FIG. 1 is an elevational view in axial or vertical cross section of a cylindrical mount with a bracket in the form of an engine mount, which is constructed according to one preferred embodiment of the invention.
Figure 2:
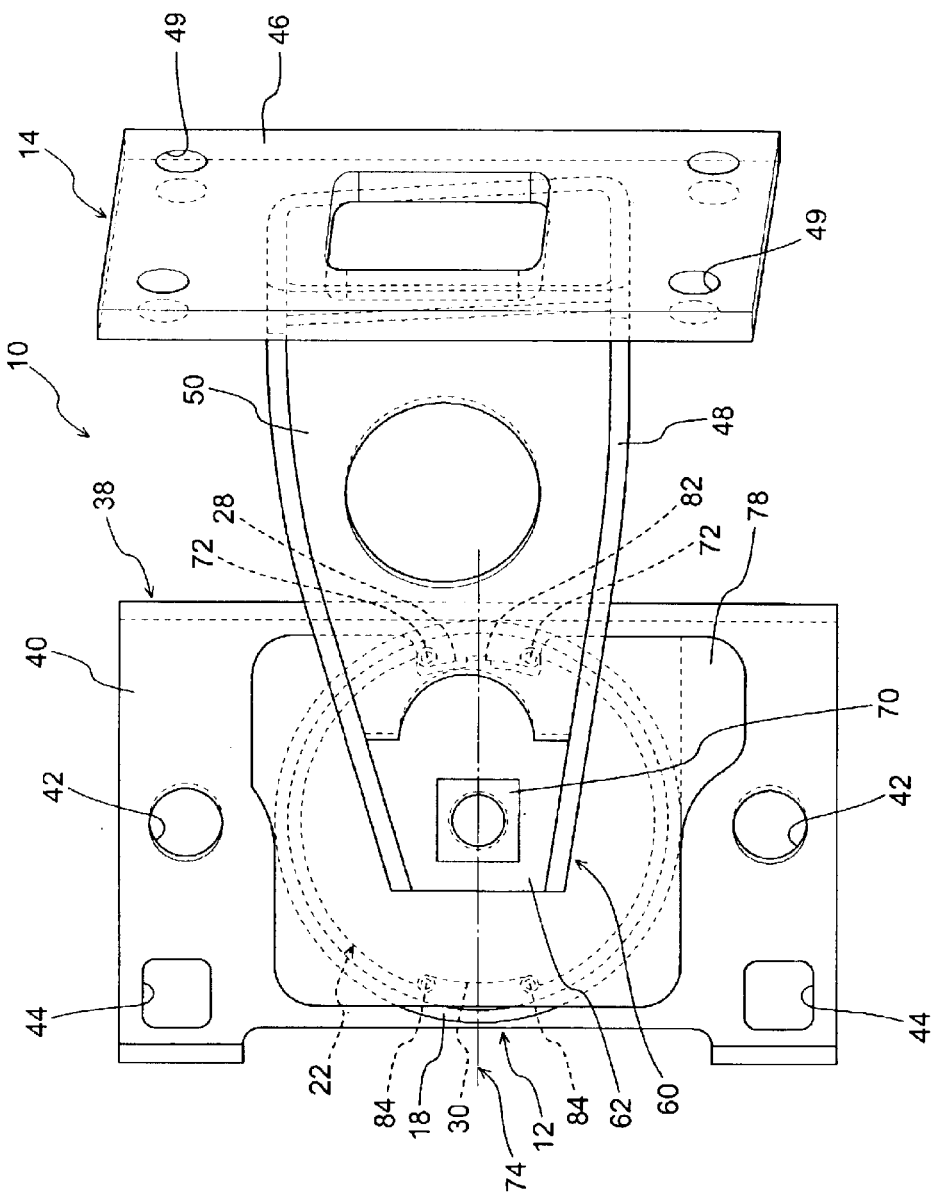
FIG. 2 is a top plane view of the engine mount of FIG. 1.

Referring first to FIGS. 1 and 2, shown is an engine mount 10 for use in automotive vehicles, constructed according to a first embodiment of a present invention relating to a cylindrical mounting apparatus equipped with a bracket. This engine mount 10 includes mutually independent members, i.e., a cylindrical mount in the form of a mount body 12 and a bracket 14, which are fixedly assembled together to construct the engine mount 10. This engine mount 10 is interposed between a body (not shown) and a power unit (not shown) of the vehicle, for elastically supporting the power unit on the body in a vibration damping fashion. In the following description, the vertical direction is basically oriented in the vertical direction as seen in FIG. 1, which is the plumb direction.

Figure 3:
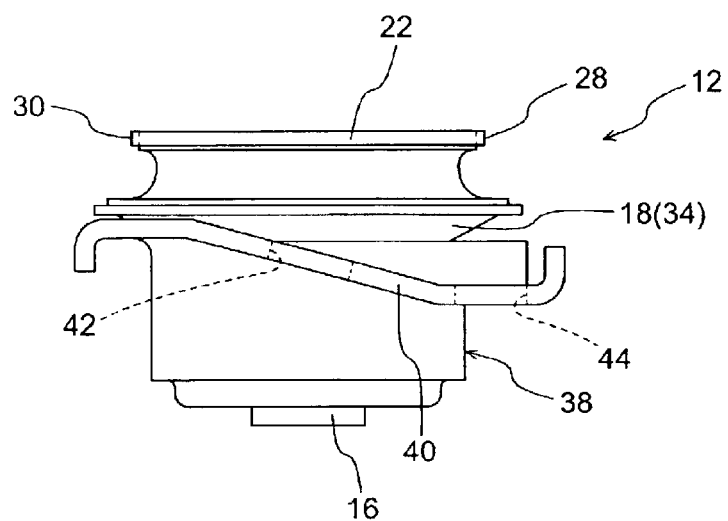
FIG. 3 is a side elevational view of a mount body of the engine mount of FIG. 1.
Figure 4:
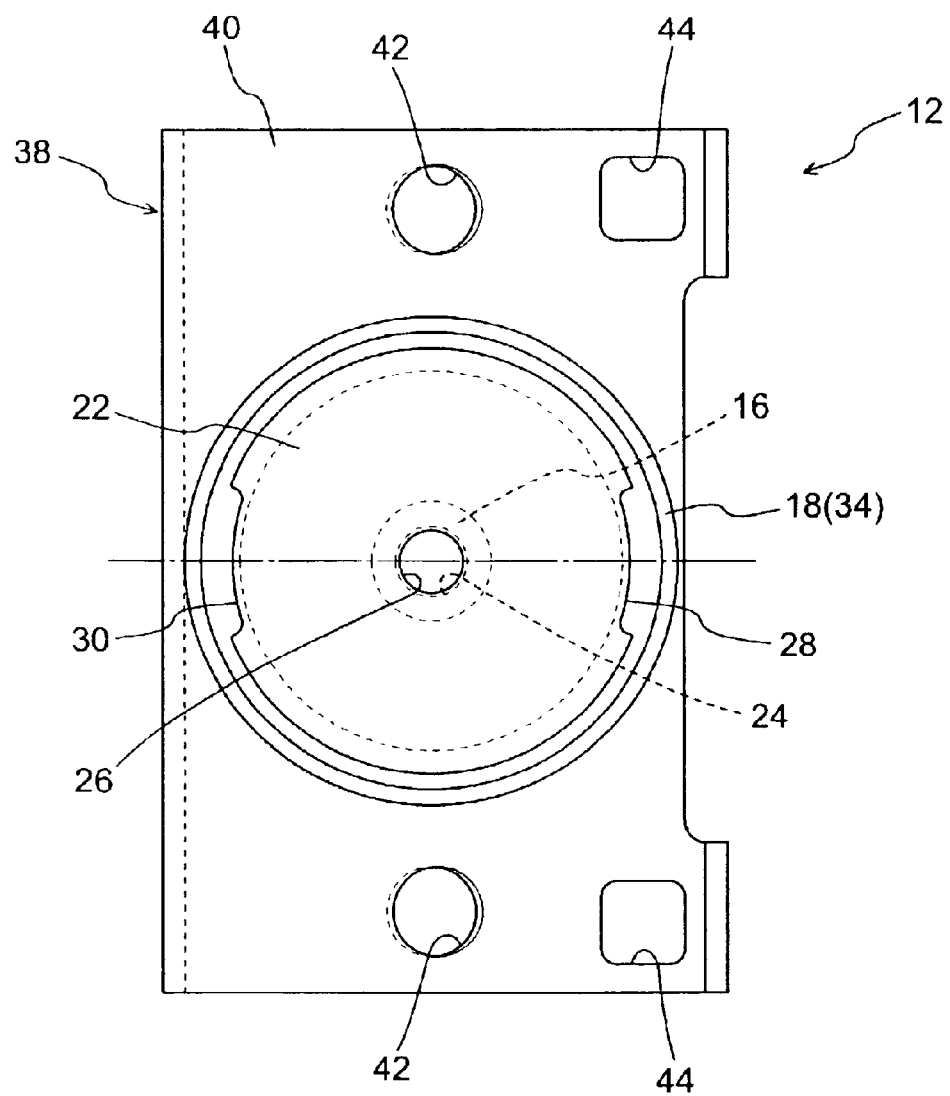
FIG. 4 is a top plane view of the mount body of FIG. 3.

As shown in FIGS. 2 and 3, the mount body 12 comprises an inner sleeve 16 of metal, an outer sleeve 18 of metal and an elastic body 20 of rubber that is interposed between the inner and outer sleeves 16, 18 for elastically connecting these two sleeves. The inner sleeve 16 is a thick-walled straight cylindrical member with a small diameter, and at its one axial end (upper end as seen in FIG. 1) is superposed on and welded to a mounting plate 22 of disk-like shape. The mounting plate 22 is disposed in co-axial or concentric relation with the inner sleeve 16, and extends outwardly in a horizontal direction orthogonal to a center axis of the inner sleeve 16. A center bore 24 of the inner sleeve 16 is approximately in alignment with a through hole 26 formed through a central portion of the mounting plate 22, whose diameter is substantially equal to that of the center bore 24.

The mounting plate 22 has a first and a second engaging part 28, 30, which are formed at respective locations diametrically opposed to each other with a center axis of the mounting plate 22 interposed therebetween. The first and second engaging parts 28, 30 are mutually symmetric in configuration, each having a cutout or recessed shape open in a circumferential surface of the mounting plate 22 with a given depthwise dimension in the horizontal direction and continuously extending in a circumferential direction of the mounting plate 22 with a given circumferential length that is smaller than a half of the circumference of the mounting plate 22. In this embodiment, the circumferential length of each engaging part may be set within a range of $\frac{1}{20}-\frac{1}{3}$ of the circumference of the mounting plate 22.

The outer sleeve 18, on the other hand, is a substantially straight cylindrical member whose diameter is made larger than that of the inner sleeve 16, and whose axial length is made smaller than that of the inner sleeve 16. The outer sleeve 18 is disposed radially outward of the inner sleeve 16 in co-axial relation with each other such that axially opposite ends of the inner sleeve 16 are axially outwardly projected beyond the outer sleeve 16. The outer sleeve 18 has an annular projection 32 integrally formed at its one axial end (the lower end as seen in FIGS. 1 and 3) so as to protrudes radially inwardly, and a tapered flange-form portion 34 integrally formed at the other axial end (the upper end as seen in FIGS. 1 and 3) thereof so as to expand diagonally outward in radial directions of the outer sleeve 18. This flange-form portion 34 is arranged to be opposed to the mounting plate 22 of the inner sleeve 16 with an axial spacing therebetween.

The elastic body 20 is interposed between the inner and outer sleeves 16, 18 both disposed in a mutually spaced-away relationship. The elastic body 20 has a substantially thick-walled cylindrical configuration in its entirety, and is bonded at its inner circumferential surface to the outer circumferential surface of the inner sleeve 16 and at its outer circumferential surface to the inner circumferential surface of the outer sleeve 18, in the course of vulcanization of a rubber material for forming the elastic body 20. A part of the elastic body 20 extends into and is disposed between axially opposed surfaces of the mounting plate 22 of the inner sleeve 16 and the flange-form portion 34 of the outer sleeve 18. That is, the inner and outer sleeves 16, 18 are directly connected with each other through the elastic body 20 interposed between their surfaces opposed both in their axial and radial directions. This elastic body 20 is provided with a pair of bores 36, 36 extending in its axial direction with a given depthwise dimension, formed at respective locations opposed to each other in one diametric direction of the elastic body 20, thereby suitably adjusting a ratio of the spring stiffness values in the two mutually orthogonal diametric directions, which are approximately in alignment with traveling and lateral directions of the vehicle, for example. The mounting plate 22 has a given outer diameter so that a circumferential portion of the mounting plate 22 is projected radially outwardly beyond the outer circumferential portion of the elastic body 20 by a given radial length. In this arrangement, the first and second engaging parts 28, 30 of the mounting plate 22 with the depthwise dimension in its diametric direction are still overall located radially outward of a bonding portion in which the elastic body 20 is bonded to the mounting plate 22 during the above described vulcanization process.

Fixedly assembled with the outer sleeve 18 is an outer bracket 38 of substantially thick-walled cylindrical shape with large diameter. The outer bracket 38 includes a plate portion 40 formed integrally at a peripheral portion of an upper axial open end thereof. The plate portion 40 has a substantially rectangular shape extending in a horizontal direction orthogonal to an axial direction of the outer bracket 38. For fixedly assembling the outer bracket 38 with the outer sleeve 18, the outer sleeve 18 is forcedly pressed into the bore of the outer bracket 38 so that the plate portion 40 of the outer bracket 38 is superposed onto the lower surface of the flange-form portion 34 of the outer sleeve 18. The plate portion 40 of the outer bracket 38 has a plurality of bolt holes 42 and guide holes 44. With the help of a guide effect provided by means of mechanical engagement of the guide holes 44 with guide pins projected from the body of the vehicle (not shown), the outer bracket 38 is installed in position, and is then fixedly attached to the body of the vehicle by means of bolts extending through the bolt holes 42. Thus, the outer sleeve 18 is fixedly mounted on the body of the vehicle, which is one of members to be connected with each other in a vibration damping fashion. A suitable configuration may be given to the plate portion 40 of the outer bracket 38 depending on the configuration of the body of the vehicle on which the engine mount 10 is installed. For instance, the outer bracket 38 may have a fixing surface or the like, for facilitating attachment of the outer bracket 38 onto an intended vehicle body.

The mount body 12 constructed as described above has a specific direction or orientation for installation on the vehicle, due to the pair of bores 36, 36 formed in the elastic body 20 and the specific configuration suitably given to the plate portion 40 of the outer bracket 38.

Figure 5:
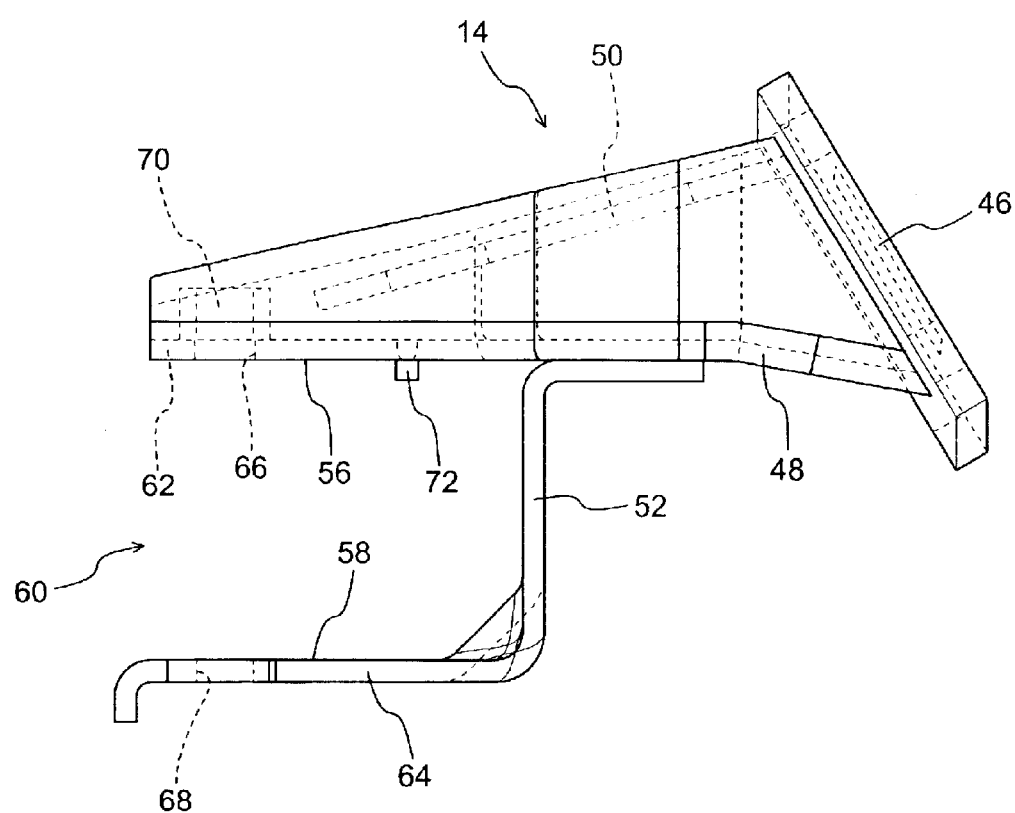
FIG. 5 is a side elevational view of a bracket of the engine mount of FIG. 1.
Figure 6:
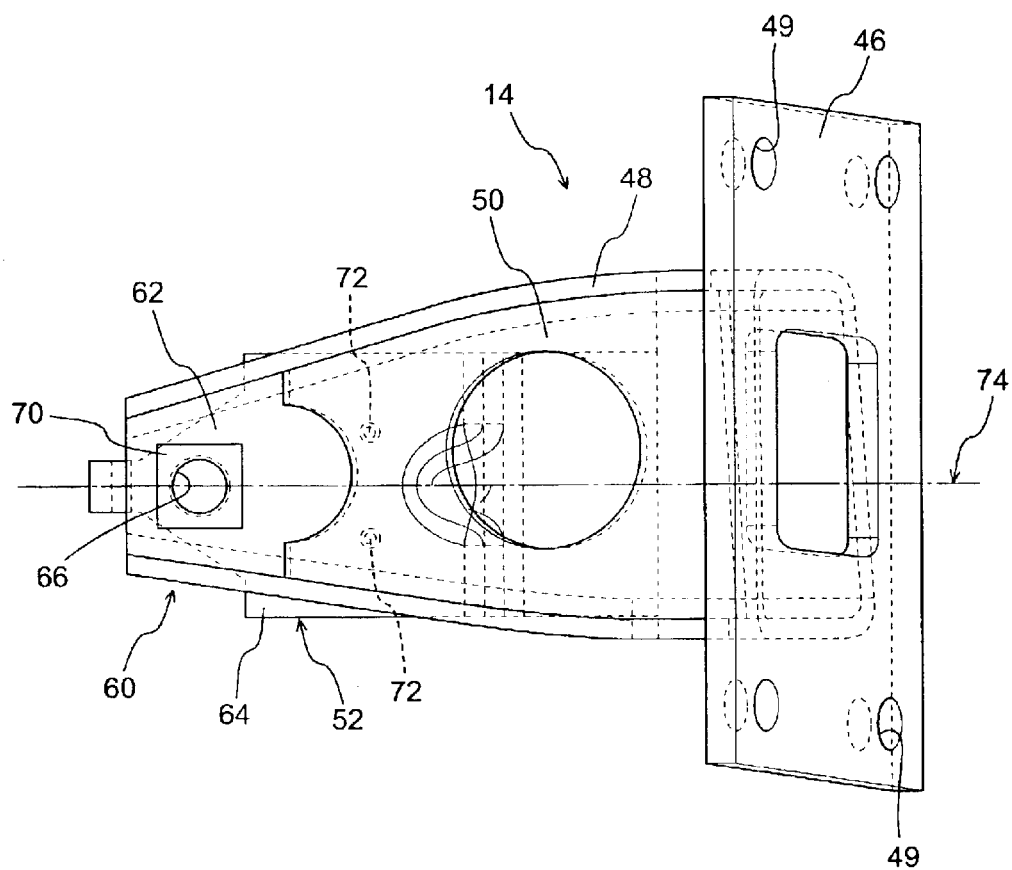
FIG. 6 is a top plane view of the bracket of FIG. 5.

On the other hand, the bracket 14, which is assembled with the mount body 12 of the above-described construction, is formed with a desired shape and rigidity, by mutually welding a plurality of steel plates formed by pressing, as shown in FIGS. 5 and 6.

Described in detail, the bracket 14 has a fixing plate 46 and an arm portion 48 of groove shape, which is fixed by welding to one of major surfaces of the fixing plate 46 so as to extend outwardly from the surface. The fixing plate 46 of the bracket 14 is adapted to be superposed on and fixed to the power unit of the vehicle, and accordingly is formed with a plurality of bolt holes 49 for receiving mounting bolts when fixed on the body.

The arm portion 48 of the bracket 14 is gradually smaller in transverse cross section towards its distal end. A cover plate 50 is welded on the upper-open end portion of the arm portion 48 for covering a desired area not to reach the distal end of the arm portion 48, thereby reinforcing the arm portion 48. The bracket 14 also includes a holder portion 52 formed of a metallic plate bent into a crank or L-letter shape viewed in cross section. The holder portion 52 is superposed on and fixed by welding to the lower surface of the arm portion 48 at an intermediate location in an extending direction of the arm portion 48. On the distal side of the arm portion 48, a floor plate 54 of the arm portion 48 and the holder 52 cooperate to provide opposite surfaces 56, 58, respectively, which extend parallel to each other and are opposed to each other with a given spacing therebetween. In this structure, the floor plate 54 and the holder portion 52 cooperate to form on the distal side of the arm portion 48 a mount support portion 60 of sideway U-letter shape, whose opening faces to the distal end of the arm portion 48. As is understood from the aforesaid description, a pair of support plates 62, 64 are defined by the floor plate 54 of the arm portion 48 and the holder portion 52, both cooperate together to form the mount support portion 60.

The mount body 12 is inserted into the spacing between the pair of support plates 62, 64, and is fixed to these support plates 62, 64 at the inner sleeve 16 thereof, whereby the mount body 12 is firmly assembled with the mount support portion 60 of the bracket 14.

The spacing or gap distance between the support plates 62, 64 are dimensioned to be slightly larger than the axial length of the inner sleeve 16 of the mount body 12. The support plates 62, 64 have through holes 66, 68, respectively, formed therethrough in their thickness direction at respective location opposed to each other. In addition, a fixing nut 70 is fixed by welding to a portion of an upper surface of the support plate 62, where the through hole 66 is opened.

The arm portion 48 of the bracket 14 further includes two positioning protrusions in the form of engaging protrusions 72, 72 formed at respective locations closer to the proximal end side of the arm portion 48 (right-hand side in FIGS. 5 and 6) than the through hole 66. According to the present embodiment, the engaging protrusions 72, 72 are small bosses of circular column like shape, each being formed by pressing downwardly corresponding portions of the arm portion 48. In detail, the engaging protrusions 72, 72 are formed at respective circumferential positions located on a circumference about a center axis of the through hole 66. These engaging protrusions 72, 72 are radially spaced away from the center axis of the through hole 66 by a radial distance corresponding to a radius of curvature of the first and second engaging parts 28, 30, while being circumferentially spaced away from each other by a circumferential distance corresponding to a circumferential dimension of the first and second engaging parts 28, 30. In particular, the pair of engaging protrusions 72, 72 have placement that are substantially symmetrical to each other to either side of a center line 74 straightly extending in a direction in which the mount support portion 60 is open, in the present embodiment.

In order to install the mount body 12 into the mount support portion 60 of the bracket 14 constructed as described above, the mount body 12 is held in its upright attitude where the center axis of the mount body 12 is oriented to an opposing direction in which the through holes 66, 68 are opposed to each other. Then, the mount body 12 is inserted in a sliding manner into the spacing between the support plates 62, 64 from the opening of the mount support portion 60 in a direction orthogonal to the opposing direction. During insertion, the mount body 12 is approximately desirably oriented in its circumferential direction so that the first engaging part 28 is located approximately forwardly in an inserting direction. During insertion of the mount body 12 into the spacing between the support plates 62, 64 as described above, the mounting plate 22 of the mount body 12 is substantially held in contact with the support plate 62 of the mount support portion 60, making it possible to hold the center axis of the mount body 12 in accurately alignment with the opposing direction of the support plates 62, 64.

When the mount body 12 is inserted to some extent into the mount support portion 60 of the bracket 14, the peripheral portion of the mounting plate 22 fixed to the inner sleeve 16 of the mount body 12 is brought into abutting contact with the engaging protrusions 72, 72 protruding from the support plate 62 of the mount support portion 60 to thereby mark the ending of the insertion of the mount body 12 into the mount support portion 60. Then, the mount body 12 is turned about its center axis by a suitable amount in order to bring the two engaging protrusions 72, 72 into engagement with the first engaging part 28 open in the peripheral portion of the mounting plate 22.

With the both engaging protrusions 72, 72 held in engagement with the first engaging part 28 of the mounting plate 22, the engaging protrusions 72, 72 are held in contact with the circumferentially opposite end portions of the first engaging part 28, respectively. Therefore, the mounting plate 22 can be registered in one specific location on a plane surface (inside surface) of the support plate 62, as long as the mount body 12 is subjected to an engaging force pressing the mount body 12 into the mount support portion 60. When being inserted into the mount support portion 60, as described above, the mount body 12 can be registered in specific location both in the axial and circumferential directions, allowing the center bore 24 of the inner sleeve 16 to be in alignment with the through holes 66, 68 at its both axial end portions, respectively. The mount body 12 inserted into the mount support portion 60 is suitably positioned as described above, making it possible to insert with ease a mounting bolt in the form of a long rod-shaped bolt 76 into the center bore 24 of the inner sleeve 16 from the bottom side of the mount support portion 60. The rod-shaped bolt 76 extends through the through hole 68 of the bracket 14, the center bore 24 of the inner sleeve 16, the through hole 26 of the mounting plate 22 and the through hole 66 of the bracket 14 in this order, as shown in FIGS. 1 and 2. A top-end threaded portion of the rod-shaped bolt 76 is threaded engaged with the fixing nut 70 fixed of the bracket 14, thereby fastening the inner sleeve 16 to the bracket 14 in the axial direction. Thus, the mount body 12 can be firmly assembled with the bracket 14 by means of the rod-shaped bolt 76.

Figure 7:
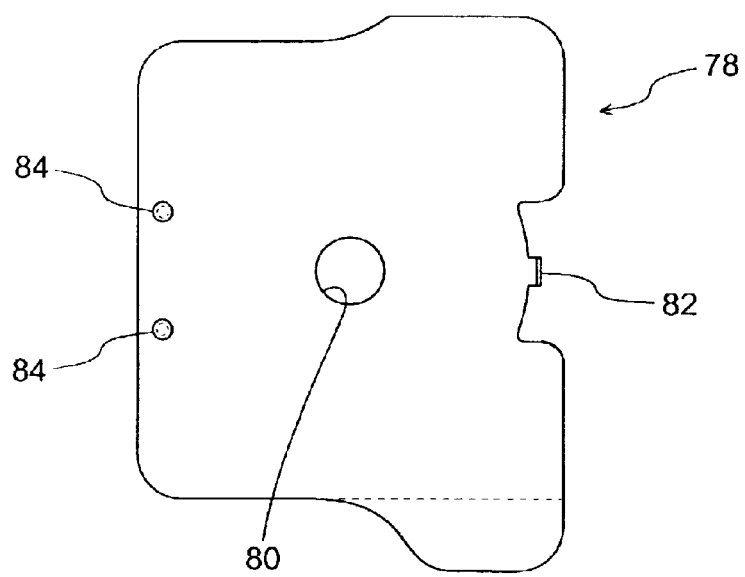
FIG. 7 is a top plane view of a heat insulator of the engine mount of FIG. 1.
Figure 8:
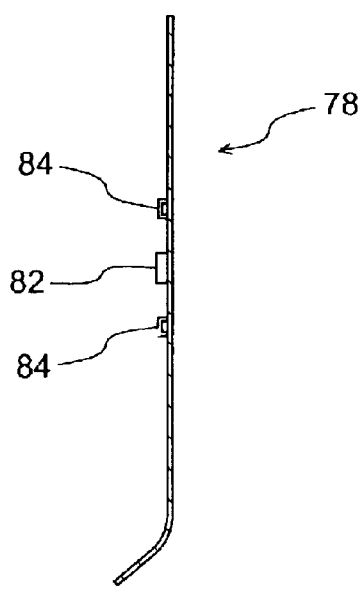
FIG. 8 is a right-side elevational view of the heat insulator of FIG. 7.

In the engine mount 10 of the present embodiment, before assembled with the bracket 14, the mount body 12 is assembled with a plate-form member in the form of a heat insulator 78 of plate-like configuration. As shown in FIGS. 7 and 8, the heat insulator 78 is a substantially rectangular plate-like member of metal or other materials having thermal insulation capacities. The heat insulator 78 is superposed on the upper surface of the mounting plate 22 of the mount body 12. The heat insulator 78 measures a dimension in plane surface that is somewhat larger than that of the mounting plate 22 so that the heat insulator 78 covers the mounting plate 22 entirely. The provision of the heat insulator 78 can restrict radiation transmission from the power unit to the elastic body 20 or other similar members of the mount body 12. The heat insulator 78 is provided with a bent portion formed at specific circumferential position determined in consideration of a positional relationship between the power unit and the heat insulator 78 relative to each other. This arrangement permits the heat insulator 78 to have a specific angular orientation about its center axis.

The heat insulator 78 has a center bore 80 formed through its central portion corresponding to the through hole 26 of the mounting plate 22, and an engaging jaw 82 of short plate shape, which is integrally formed by bending a local portion of a peripheral portion of the heat insulator 78, located on one of opposite side (right-hand side as seen in FIG. 7) of the center bore 80 in one diametric direction orthogonal to the axis of the center bore 80. On the other side (left-hand side as seen in FIG. 7) of the center bore 80, a pair of engaging projections 84, 84 are formed at the peripheral portion of the heat insulator 78 so as to project downwardly. According to the present embodiment, the engaging projections 84, 84 are small bosses of circular column like shape, each being formed by pressing corresponding portions of the heat insulator 78 downwardly. The engaging projections 84, 84 are formed at respective circumferential positions located on a circumference about the center axis of the center bore 80 such that the engaging projections 84, 84 are radially spaced away from the center axis of the center bore 80 by a radial distance corresponding to the radius of curvature of the first and second engaging parts 28, 30, while being circumferentially spaced away from each other by a circumferential distance corresponding to the circumferential dimension of the first and second engaging parts 28, 30. In particular, the placement of the pair of engaging projections 84, 84 with respect to the center axis of the center bore 80 is similar to the placement of the engaging protrusions 72, 72 with respect to the center axis of the through hole 66.

For superposing the heat insulator 78 on the upper surface of the mounting plate 22 of the mount body 12, the engaging jaw 82 of the heat insulator 78 is held in engagement with a circumferentially central portion of the first engaging part 28 of the mounting plate 22, while the engaging projections 84, 84 of the insulator 78 is held in engagement with circumferentially opposite end portions of the engaging part 30. By engaging the engaging jaw 82 as well as the engaging projections 84, 84 with the respective portions of the mounting plate 22 as described above, the heat insulator 78 can be placed on and supported by the upper surface of the mounting plate 22 in its horizontal attitude. In this state, the heat insulator 78 is held in the desired position on a horizontal plane of the upper surface of the mounting plate 22 in a circumferential direction about the center axis of the center bore 80 and in a direction orthogonal to the center axis of the center bore 80.

Since the heat insulator 78 is superposed on the upper surface of the mounting plate 22 of the mount body 12 as described above before the assembly of the mount body 12 with the bracket 14, the desired placement of the mount body 12 can be easily and accurately established. In addition, the heat insulator 78 can be placed in position by simply superposing it on the mounting plate 22. Therefore, the mounting plate 22 can be assembled in position, by simply inserting the mount body 12 into the bracket 14 according to the aforesaid manner, without needing a specific procedure for fixing the heat insulator 78 on the mounting plate 22. Further, the heat insulator 78 can be compressed by and supported between the mounting plate 22 and the support plate 62 as a result of the assembly of the mount body 12 with the bracket 14 as described above. This makes it possible to fixedly installed the heat insulator 78 into the engine mount 10, while highly ensuring a specific directional feature or orientation of the heat insulator 78, without needing any additional operation.

According to the engine mount 10 constructed as described above, the mount body 12 can be inserted with its desired placement into the bracket 14 independent of the mount body 12, through an extremely easy operation, and can be fastened to bracket 14 by means of the rod-shaped bolt 76 extending therethrough. The advantage of the engine mount 10 can skyrocket efficiency and accuracy in operation for assembling the engine mount 10.

A further advantage of the engine mount 10 is that a positioning mechanism for accurately placing the mount body 12 relative to the bracket 14 can be established simply by means of the engagement between the engaging protrusions 72, 72 of simple structure formed on the bracket 14 and the first engaging part 28 of simple structure formed into the mount body 12. Therefore, the mount body 12 and the bracket 14 are simple in construction and easy to manufacture, and the engine mount 10 according to the present embodiment can be easily established by utilizing conventional engine mounts with minimal modifications required.

The above-described positioning mechanism is also applied to the positioning of the heat insulator 78 relative to the mount body 12, so that the heat insulator 78 can be easily and precisely installed in the engine mount 10 at the same time when the mount body 12 is assembled with the bracket 14. In detail, while the first and second engaging parts 28, 30 are formed into the mounting plate 22 for use in the positioning of the mount body 12 originally, these parts 28, 30 are also utilized to be held in engagement with the engaging jaw 82 and engaging projections 84, 84 of the heat insulator 78, thereby establishing the positioning mechanism for suitably positioning the heat insulator 78 relative to the mount body 12. Therefore, the engine mount 10 according to the present embodiment can efficiently establish the positioning mechanism of simple construction for the heat insulator 78, as well.

While the presently preferred embodiment of this invention has been described in detail for the illustrative purpose only, it is to be understood that the present invention is not limited to the details of the illustrated embodiment. It is also to be understood that the present invention may be embodied with various changes, modifications and improvements which may occur to those skilled in the art, without departing from the spirit and scope of the invention, although detail description of these modifications is omitted.

For instance, while the mounting plate 22 is fixed only to one of opposite axial end portions of the inner sleeve 16 in the illustrated embodiment, it may be possible to fix the mounting plates 22 to both axial end portions of the inner sleeve 16, in order to adjust spring characteristics generated at axially opposite portions of the engine mount 10, or alternatively in order to provide stop mechanism for limiting axial displacement of the inner and outer sleeves 16, 18 relative to each other.

While in the illustrated embodiment, the outer bracket 38 is attached onto the outer sleeve 18, the outer bracket 38 is not essential to practice the present invention. For instance, the outer sleeve 18 may be directly fixed by pressing into a mounting bore formed into one of members to be connected together in a vibration damping fashion. Alternatively, the outer sleeve 18 may have a mounting arm integrally formed on the outer circumferential surface thereof.

Further, while in the illustrated embodiment the mounting plate 22 is provided with two engaging parts 28, 30, it may be possible to form only one engaging part 28 into the mounting plate 22. It should be noted that the provision of the one engaging part 28 is able, like in the illustrated embodiment, not only to position desirably the mounting body 12 relative to the bracket 14, but also to position the heat insulator 78 desirably.

Although the specific embodiment of the engine mount for use in automotive vehicles has been described above, the invention is not limited to the illustrated embodiment, but the principle of the invention is equally applicable to other mounts for automotive vehicles including body mounts, differential mounts, cab mounts, sub-flame mounts, and various cylindrical mounts with brackets for use in various kinds of equipment other than the automotive vehicles.

What is claimed is:

1. A cylindrical mounting apparatus equipped with a bracket comprising:
   a cylindrical mount including an inner and outer sleeve disposed in mutually spaced-apart relation with each other, and an elastic body interposed between said inner and outer sleeves so as to elastically connect said inner and outer sleeves;
   a bracket independent of said cylindrical mount, having a pair of support plates opposed to each other with a spacing therebetween, and assembled with said cylindrical mount such that said cylindrical mount is inserted into said spacing between said pair of support plates and fasten to said bracket by means of a mounting bolt extending through a bore of said inner sleeve across said pair of support plates;

two positioning protrusions formed on and protruding from at least one of said pair of support plates toward an other of said pair of support plate; and a mounting plate disposed on one of axially opposite end portions of said inner sleeve so as to extend in a direction orthogonal to an axial direction of said inner sleeve, said mounting plate being held in contact with an inside surface of said at least one of said pair of support plates, and having an engaging portion of recessed shape, which is open in an outer circumferential surface of said mounting plate, and which is brought into abutting contact with said two positioning protrusions so as to place said mounting plate in a predetermined position about a center axis of said inner sleeve on said inside surface of said at least one of said pair of support plates, wherein said engaging portion comprises a cutout portion formed at a peripheral portion of said mounting plate, extending circumferentially with a circumferential length not larger than a half of a circumference of said mounting plate, and circumferentially opposite end portions of said cutout portion are brought into engagement with said two positioning protrusions of said at least one of said pair of support plates, respectively, and wherein said cutout portion is shaped to expand gradually in a circumferential dimension thereof toward said peripheral portion of said mounting plate.

2. A cylindrical mounting apparatus equipped with a bracket according to claim 1, wherein a specific angular orientation of said cylindrical mount is determined for assembling said cylindrical mount with said bracket.

3. A cylindrical mounting apparatus equipped with a bracket according to claim 1, wherein said outer sleeve includes a flange-form portion formed at one of axially opposite ends thereof so as to extend in a radially outward direction of said outer sleeve, said flange-form portion being opposed to said mounting plate of said inner sleeve with an axial spacing therebetween, and elastically connected with said mounting plate by said elastic body.

4. A cylindrical mounting apparatus equipped with a bracket according to claim 1, wherein said elastic body includes a pair of bores extending in an axial direction thereof with a given depthwise dimension and formed at respective locations opposed to each other in one diametric direction of said elastic body.

5. A cylindrical mounting apparatus equipped with a bracket comprising:

a cylindrical mount including an inner and outer sleeve disposed in mutually spaced-apart relation with each other, and an elastic body interposed between said inner and outer sleeves so as to elastically connect said inner and outer sleeves;

a bracket independent of said cylindrical mount, having a pair of support plates opposed to each other with a spacing therebetween, and assembled with said cylindrical mount such that said cylindrical mount is inserted into said spacing between said pair of support plates and fasten to said bracket by means of a mounting bolt extending through a bore of said inner sleeve across said pair of support plates;

two positioning protrusions formed on and protruding from at least one of said pair of support plates toward an other of said pair of support plate;

a mounting plate disposed on one of axially opposite end portions of said inner sleeve so as to extend in a direction orthogonal to an axial direction of said inner sleeve, said mounting plate being held in contact with an inside surface of said at least one of said pair of support plates, and having an engaging portion of recessed shape, which is open in an outer circumferential surface of said mounting plate, and which is brought into abutting contact with said two positioning protrusions so as to place said mounting plate in a predetermined position about a center axis of said inner sleeve on said inside surface of said at least one of said pair of support plates, wherein said engaging portion comprises a cutout portion formed at a peripheral portion of said mounting plate, extending circumferentially with a circumferential length not larger than a half of a circumference of said mounting plate, and circumferentially opposite end portions of said cutout portion are brought into engagement with said two positioning protrusions of said at least one of said pair of support plates, respectively, and a plate-form member independent of said cylindrical mount and said bracket, said plate-form member being superposed on said mounting plate, sandwiched between and supported by said mounting plate and said at least one of said pair of support plates, and having an engaging jaw brought into engagement with a circumferentially intermediate portion of said cutout portion of said mounting plate.

6. A cylindrical mounting apparatus equipped with a bracket according to claim 5, wherein said mounting plate has a disk-like shape and includes two of said cutout portions located at respective portions diametrically opposed to each other, and wherein one of said cutout portions is adapted to be brought into engagement with said engaging jaw at said circumferentially intermediate portion thereof, and said plate-form member includes an engaging projection adapted to be brought into engagement with circumferentially opposite end portions of an other of said cutout portions so that said plate-form member is placed in a predetermined position on said mounting plate as a result of engagement of said two cutout portions with said engaging jaw and said engaging projections, respectively.

7. A cylindrical mounting apparatus equipped with a bracket according to claim 5, wherein a specific angular orientation of said cylindrical mount is determined for assembling said cylindrical mount with said bracket.

8. A cylindrical mounting apparatus equipped with a bracket according to claim 5, wherein said outer sleeve includes a flange-form portion formed at one of axially opposite ends thereof so as to extend in a radially outward direction of said outer sleeve, said flange-form portion being opposed to said mounting plate of said inner sleeve with an axial spacing therebetween, and elastically connected with said mounting plate by said elastic body.

9. A cylindrical mounting apparatus equipped with a bracket according to claim 5, wherein said elastic body includes a pair of bores extending in an axial direction thereof with a given depthwise dimension and formed at respective locations opposed to each other in one diametric direction of said elastic body.

* * * * *